United States Patent Office 3,246,535
Patented Apr. 19, 1966

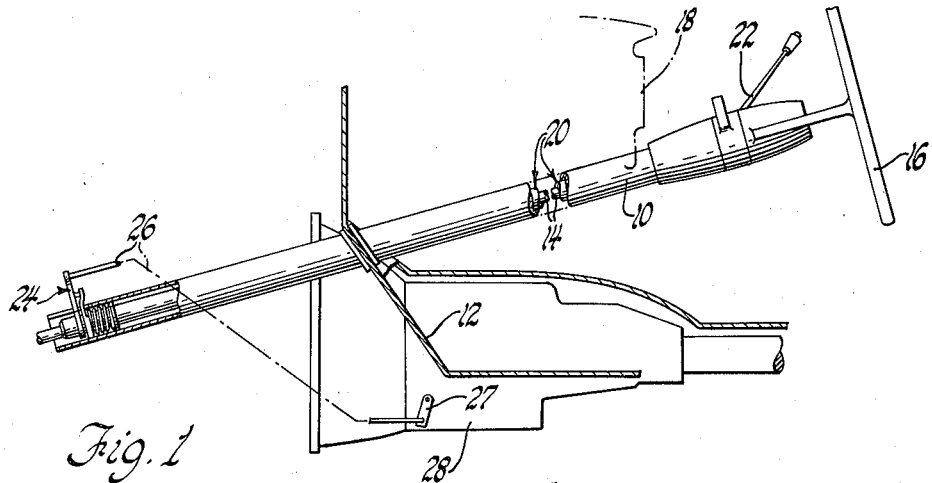
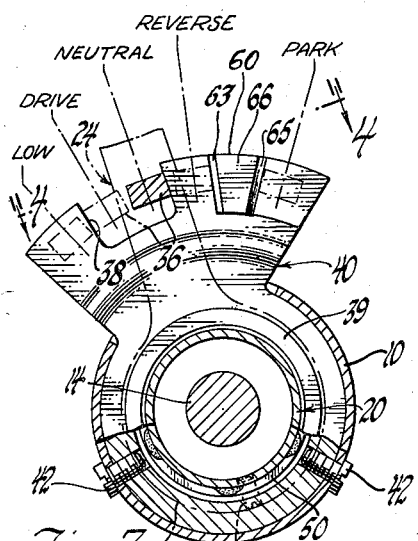
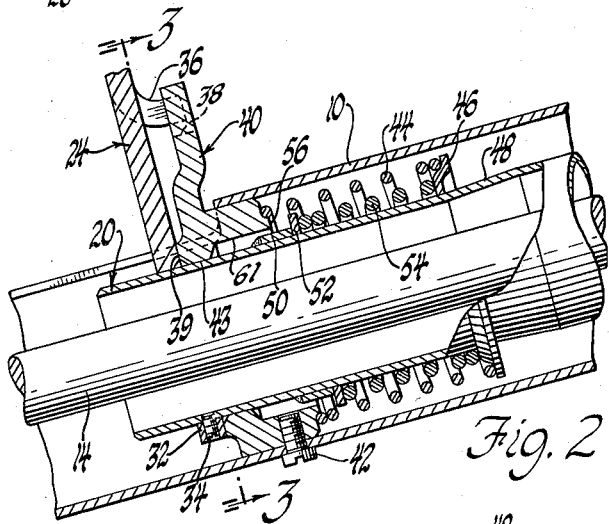
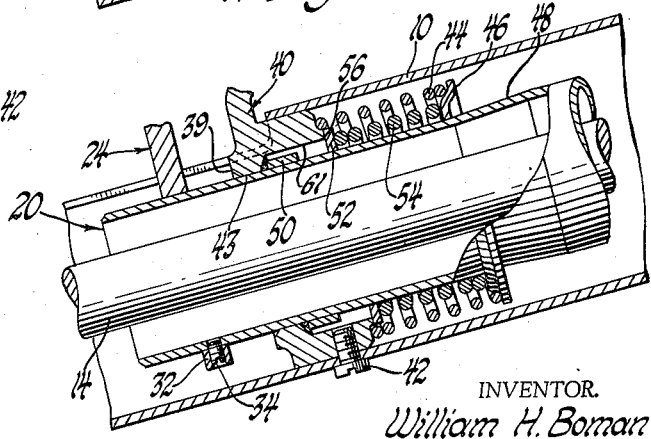

3,246,535
TRANSMISSION CONTROLS
William H. Boman, Birmingham, Mich., assignor to General Motors Corporation, Detroit, Mich., a corporation of Delaware
Filed Aug. 13, 1963, Ser. No. 301,825
19 Claims. (Cl. 74—475)

This invention relates to controls and more particularly to a transmission control mechanism having variable rate biasing means cooperating with a detent device to provide different biasing forces resisting movement of the transmission control from one limited selection of shift positions to another and ensuring that the transmission control remains in a predetermined shift position.

The manual transmission control mechanism is conventionally mounted on the steering column of the vehicle with the hand control lever located beneath the steering wheel. The hand control lever is pivoted on the steering column and actuates a control tube to selectively move a controlled shift lever between a plurality of shift positions. Control linkage connects the controlled shift lever to the transmission to be controlled which may be either a manually shiftable or automatic type transmission. In transmission controls of this type using a single controlled shift lever rotatable between a plurality of shift positions it is desirable that the operator be required to perform a manual operation to which his senses will be keenly aware prior to the selection of certain of the drive ranges and other conditions of the transmission.

In transmissions of the automatic type having a plurality of selective conditions such as conditions of Park, Reverse, Neutral, Drive and Low and where only a single controlled shift lever is operated to effect these conditions, it is desirable that accidental shifts into Reverse or Park be minimized while the vehicle is in forward motion. In addition it is desirable that shifts between Reverse and Low may be made easily in order to rock the vehicle out of mud, snow and the like. Furthermore, it is desirable that accidental shifts into Low when the selection of Drive was intended be minimized since Low operation when not required places unnecessary loads on the transmission and adversely affects fuel economy. It is further desirable that the controlled shift lever not be permitted to inadvertently remain in an intermediate position between positions such as Reverse and Park since such condition can permit a jolting effect both on the transmission and the passengers when the controlled shift lever is finally moved fully into either Reverse or Park with the engine running.

In one illustrated form of the invention a detent member is secured to the steering column and rotatably supports the lower end of a control tube internal of the steering column. The control tube is adapted to be rotated and reciprocated by conventional structure connecting it to a hand lever adjacent the steering wheel. A controlled shift lever which is adapted to be connected by suitable control linkage to the transmission to be controlled is secured to the lower end of the control tube and when selectively rotated by the hand lever is effective to condition the transmission for conditions such as Park, Reverse, Neutral, Drive and Low. The controlled shift lever has a tang selectively engageable with a slot and a stop on the detent member and in cooperation with variable rate spring means prevents inadvertent and undesirable shifts and ensures that the controlled shift lever is not permitted to remain in a position between Reverse and Park. The variable rate biasing means provide different biasing forces to resist axial movement of the control tube and include a first spring having a relatively low biasing force arranged to bias the control tube in an axial direction and toward the detent member to a first axial position. In the first axial position the tang is received in the slot and permits rotatable movement of the controlled shift lever between positions corresponding to Neutral and Drive.

In a first range of axial movement of the control tube the control tube is moved axially against the bias of the first spring to a second axial position where the tang clears the slot and permits selective rotatable movement of the controlled shift lever to positions corresponding to Low and Reverse. To obtain Park requires a second range of axial movement of the control tube to a third axial position where the tang clears the stop to permit rotatable movement of the controlled shift lever to a position corresponding to Park.

In the second range of axial movement the first spring in cooperation with a second spring having a higher biasing force yieldingly and abruptly resists this control tube movement with a high degree of force. The tang is provided with a ramp having an inclination corresponding to that of a ramp provided on the stop of the detent member. In the event that the hand control lever is released while the controlled shift lever is in a position between Park and the Reverse positions the ramp on the tang will be urged against the ramp on the stop by the combined biasing forces of the first and second springs. Since the detent member is held stationary the tang is forced down the ramp of the stop and the controlled shift lever is rotated to the position corresponding to Reverse.

An object of the invention is to provide an improved transmission control for effecting the different operating conditions of a transmission.

Another object of the invention is to provide a transmission control having variable rate biasing means cooperating with a detent device to prevent inadvertent shifts and ensure that the controlled shift lever remains in a predetermined shift position.

Another object of the invention is to provide a transmission control having a variable rate biasing means cooperating with a detent device to limit the shift selections of a controlled shift lever in a first position and resist a first range of movement of the shift lever to a second position of limited shift selections with one biasing force and abruptly resist a second range of movement of the shift lever to a third position with a higher biasing force, and the shift lever being movable in the third position to a shift selection and being ensured against being left in a position intermediate the latter shift selection and one of the shift selections in the second position.

These and other objects of the invention will be more apparent to those skilled in the art from the following description of the preferred embodiment of the invention illustrated in the accompanying drawing in which:

FIGURE 1 is an elevation view illustrating one form of a transmission control mechanism according to the invention mounted on the steering column and adapted for use with an automatic type transmission.

FIGURE 2 is an enlarged partial fragmentary sectional view of the transmission control mechanism showing the controlled shift lever in Neutral.

FIGURE 3 is a partial fragmentary cross sectional view on the line 3—3 in FIGURE 2.

FIGURE 4 is a plan view on the plane indicated by the line 4—4 of FIGURE 3.

FIGURE 5 is the same view as FIGURE 2 showing the controlled shift lever in Park.

Referring to FIGURE 1 a steering column 10 adapted to be fixed to the chassis of the vehicle extends through and is supported by the toe board 12 of the vehicle. Steering column 10 rotatably supports a steering shaft 14 which is rotated by a steering wheel 16 rearward of the vehicle dash 18. A shift control tube 20 concentrically mounted between the steering shaft 14 and steering column 10 is supported by the steering column for rotary and reciprocal movement relative to its own axis. The control tube 20 is rotated and reciprocated by conventional structure including the hand lever 22 mounted on the steering column 10 adjacent the steering wheel 16. An example of structure effective to rotate and reciprocate the control tube 20 may be seen in the Gurney et al. Patent 2,875,637.

A controlled shift lever 24 which is connected by suitable control rod linkage 26 to the transmission shift lever 27 of an automatic type transmission 28 has an annular portion 32 received on the lower end of control tube 20. In the illustrated form of the invention the transmission 28 to be controlled has conditions of Park, Reverse, Neutral, Drive and Low. Lever 24 is secured to the control tube 20 by a screw 34 and has a tang 36 adapted to be received in a slot 38 of an annular detent or bracket member 40 of the detent device. Detent member 40 is secured to the steering column 10 by two screws 42 and has a bore 43 freely receiving the lower end of the control tube 20 to aid in supporting the control tube in the steering column.

The control tube 20 is biased upwardly relative to the steering column 10 by a first coil spring 44 which is compressed between and abuts the detent member 40 and an abutment plate 46. Abutment plate 46 is prevented from upward axial movement relative to the control tube 20 from the position shown in FIGURE 2 by its engagement with a tapered portion 48 of the control tube 20. With the tang 36 received in the slot 38 upward movement of the lever 24 and the control tube 20 is limited by the annular portion 32 of the lever 24 abutting the end face 39 of detent member 40 as shown in FIGURE 2.

A stop ring 50 is welded to the control tube 20 to locate an abutment washer 52 for a second coil spring 54 concentrically mounted between the first coil spring 44 and the control tube 20. Spring 54 engages the washer 52 and also like spring 44 engages the abutment plate 46. When the control tube 20 is in the first axial position shown in FIGURE 2 with the annular portion 32 of the lever 24 abutting the end face 39 of the detent member 40, the spring 44 and the spring 54 are both slightly compressed. The abutment washer 52 is engageable with the end face 56 of detent member 40 to compress the spring 54 in a manner which is described in detail below. Preferably the spring 44 has a relatively low spring or biasing force and the spring 54 has a larger spring or biasing force.

With the control tube in the first axial position the control tube 20 and associated controlled shift lever 24 having the tang 36 can only be rotated between the conditions of Neutral and Drive of the transmission 28 and these conditions are determined by the limit means provided by the tang 36 selectively engaging the radially extending side walls of the slot 38. FIGURE 3 best illustrates the shift positions of the lever 24 and shows the tang 36 engaging the righthand side wall of the slot 38 to locate the lever 24 in the Neutral position.

During movement of the control tube 20 through a first range of movement to a second axial position to clear the tang 36 from the slot 38 the abutment washer 52 does not engage with the end face 56 and movement of the control tube is only against the bias or resistance of spring 44. In the second axial position, the lever 24 is rotatable by the control tube 20 between Low and Reverse. Thus, shifts between Low and Reverse can easily be made for rocking the vehicle out of snow, mud and the like. Stop means including an axially extending projection or stop 60 on detent member 40 and the tang 36 which is engageable with the stop 60 prevent rotary movement of the control tube 20 and lever 24 from Reverse to the Park position while the control tube is in the second axial position and the spring 44 yieldingly holds the tang 36 against the side portion 62 of the detent member 40 in the second axial position to prevent rattling and aids in maintaining the lever 24 in either Low or Reverse.

Upon further downward movement of the control tube 20 from the second axial position through a second range of movement to a third axial position the washer 52 engages the end face 56 as shown in FIGURE 5 and this second range of movement is resisted both by the spring 44 and by the additional biasing force of spring 54. Since the spring 54 was in an initial state of compression the initial force encountered resisting the second range of movement of the control tube 20 to the third axial position is an abruptly larger force. In the third axial position the tang 36 clears the stop 60 to permit rotary movement of the control tube 20 and the lever 24 from Reverse to Park. Further downward movement of the control tube 20 from the third axial position is limited by the stop ring 50 engaging the end wall of the counterbore 61 in detent member 40.

As best shown in FIGURE 4 side portion 64 of detent member 40 in the region corresponding to the Park position is located so that the control tube is between the second and third axial positions when the lever 24 is in Park and the combined biasing forces of the springs 44 and 54 are active to urge the tang 36 against the side portion 64 in the Park position and resist movement of the control tube 20 to the third axial position to return the lever 24 from Park to Reverse. To provide smooth movement of the tang 36 over stop 60 the opposite sides 63 and 65 of the stop 60 are sloped.

The stop 60 has a ramp 66 and provided on the end of the tang 36 is a corresponding ramp 68 having the same inclination. In the event that the hand lever 22 is inadvertently released while the lever 24 is in a position between the Reverse and Park positions the combined biasing forces of the springs 44 and 54 urge the ramp 68 of the tang 36 against the ramp 66 of the stop 60. Since the stop 60 is fixed against rotation the tang 36 is forced by the combined biasing forces to ride down the ramp 66 thus moving the lever 24 to the Reverse position.

The above-described preferred embodiment is illustrative of the invention which may be modified within the scope of the appended claims.

I claim:

1. A shift control mechanism comprising in combination,
   (A) support means,
   (B) control means supported by said support means for rotary and reciprocal movement relative to a fixed axis,
   (C) controlled means operatively connected to rotate and reciprocate with said control means,
   (D) variable rate biasing means providing one biasing force resisting axial movement of said control means in a first range of movement from a first position to a second position and a larger biasing force resisting axial movement of said control means in a second range of movement from the second position to a third position,
   (E) and detent means including limit means and stop means fixed to said support means and said controlled means limiting rotatable movement of said controlled means in said first position to a first predetermined number of shift positions, permitting rotatable movement of said controlled means in said second position to a second predetermined number of shift positions and preventing rotational movement in one rotational direction from one of said second predetermined number of shift positions, and permitting further rotatable movement of said controlled means in said third position in said one rotational direction from said one of said second predetermined number of shift positions to a third predetermined number of shift positions.

2. The invention defined in claim 1 and said stop means including a stop fixed to said support means and a tang fixed to said controlled means engageable with said stop.

3. The invention defined in claim 2 and said one biasing force being provided by a first spring and said larger biasing force being provided by a second spring acting in cooperation with said first spring.

4. A shift control mechanism comprising in combination,
(A) support means,
(B) control means supported by said support means for rotary and reciprocal movement relative to a fixed axis,
(C) controlled means operatively connected to rotate and reciprocate with said control means,
(D) variable rate spring means providing one biasing force resisting axial movement of said control means in a first range of movement from a first position to a second position and a larger biasing force resisting axial movement of said control means in a second range of movement from the second position to a third position,
(E) detent means including limit means and stop means fixed to said support means and said controlled means limiting rotatable movement of said controlled means in said first position to a first predetermined number of shift positions, permitting rotatable movement of said controlled means in said second position to a second predetermined number of shift positions and preventing rotational movement in one rotational direction from one of said second predetermined number of shift positions, and permitting further rotatable movement of said controlled means in said third position in said one rotational direction from said one of said second predetermined number of shift positions to a third predetermined number of shift positions and preventing rotatable movement of said controlled means in the opposite direction from one of said third predetermined number of shift positions to said one of said second predetermined number of shift positions,
(F) and said stop means having inclined ramps urged into engagement with each other by said variable rate biasing means when said controlled means is in a position intermediate and adjacent said one of said second predetermined number of shift positions and said one of said third predetermined number of shift positions and operable to urge said controlled means from said intermediate position to one of said adjacent shift positions.

5. The invention defined in claim 4 and said inclined ramps being urged into engagement by said larger biasing force of said variable rate biasing means.

6. The invention defined in claim 5 and said one biasing force being provided by a first spring and said larger force being provided by a second spring acting in cooperation with said first spring.

7. The invention defined in claim 4 and said stop means including a stop fixed to said support means and a tang fixed to said controlled means engageable with said stop.

8. In a control for selectively effecting rotational and axial movements of a controlled member the combination of,
(A) support means,
(B) control means supported by said support means for rotary and reciprocal movement relative to a fixed axis,
(C) a controlled shift lever operatively connected to said control means for rotatable and reciprocal movement therewith,
(D) variable rate biasing means providing one biasing force resisting axial movement of said control means from a first axial position to a second axial position and a larger biasing force resisting axial movement of said control means from said second axial position to a third axial position,
(E) said controlled shift lever being rotatable by said control means to a plurality of shift positions including a first shift position when said control means is in said second axial position and to a second shift position when said control means is in said third axial position,
(F) and means fixed to said control means and said support means to prevent rotational movement of said controlled shift lever from said first shift position to said second shift position when said control means is in said second axial position.

9. In a control for selectively effecting rotational and axial movements of a controlled member the combination of,
(A) support means,
(B) control means supported by said support means for rotary and reciprocal movement relative to a fixed axis,
C) a controlled shift lever operatively connected to said control means for rotatable and reciprocal movement therewith,
(D) variable rate biasing means providing one biasing force resisting axial movement of said control means from a first axial position to a second axial position and a larger biasing force resisting axial movement of said control means from said second axial position to a third axial position,
(E) said controlled shift lever being rotatable by said control means to a plurality of shift positions including a first shift position when said control means is in said second axial position and to a second shift position when said control means is in said third axial position,
(F) and means fixed to said control means and said support means cooperative with said variable rate biasing means to rotate said controlled shift lever to one of said first and second shift positions when said controlled shift lever is momentarily left in a position intermediate said first and second shift positions.

10. The invention defined in claim 9 and said means fixed to said control means and said support being cooperative with said larger biasing force of said variable rate biasing means to rotate said controlled shift lever to said one of said first and second shift positions.

11. In a control for selectively effecting rotational and axial movements of a controlled member the combination of,
(A) support means,
(B) control means supported by said support means for rotary and reciprocal movement relative to a fixed axis,
(C) a controlled shift lever operatively connected to said control means for rotatable and reciprocal movement therewith,
(D) variable rate biasing means providing one biasing force resisting axial movement of said control means from a first axial position to a second axial position and a larger biasing force resisting axial movement of said control means from said second axial position to a third axial position,
(E) said controlled shift lever being rotatable by said control means to a first shift position when said control means is in said second axial position and to a second shift position when said control means is in said third axial position,
(F) and stop means fixed to said control means and said support means preventing rotational movement of said controlled shift lever between said shift positions when said controlled shift lever is in said first shift position and when said controlled shift lever is in said second shift position.

12. The invention defined in claim 11 and said stop means including means operative in cooperation with said variable rate spring means to rotate said controlled shift lever from a position intermediate said first and second shift positions to one of said first and second shift positions.

13. In a control for selectively effecting rotational and axial movements of a controlled member the combination of, (A) support means,
(B) control means supported by said support means for rotary and reciprocal movement relative to a fixed axis,
(C) a controlled shift lever operatively connected to said control means for rotatable and reciprocal movement therewith,
(D) variable rate biasing means providing one biasing force resisting axial movement of said control means from a first axial position to a second axial position and a larger biasing force resisting axial movement of said control means from said second axial position to a third axial position,
(E) said controlled shift lever being rotatable by said control means to a first shift position when said control means is in said second axial position and to a second shift position when said control means is in said third axial position,
(F) stop means fixed to said control means and said support means preventing rotational movement of said controlled shift lever between said shift positions when said controlled shift lever is in said first shift position and when said controlled shift lever is in said second shift position,
(G) and said stop means having inclined ramps urged to engage with each other by said variable rate spring means when said controlled shift lever is in a position intermediate said first and second shift positions and operable in cooperation with said larger biasing force of said variable rate spring means to rotate said controlled shift lever from said intermediate position to one of said first and second shift positions.

14. In a control for selectively effecting rotational and axial movements of a controlled member the combination of,
(A) support means,
(B) control means supported by said support means for rotary and reciprocal movement relative to a fixed axis,
(C) a controlled shift lever operatively connected to said control means for rotatable and reciprocal movement therewith,
(D) variable rate biasing means providing one biasing force resisting axial movement of said control means from a first axial position to a second axial position and a larger biasing force resisting axial movement of said control means from said second axial position to a third axial position,
(E) limit means fixed to said control means and said support means to limit rotational movement of said controlled shift lever between a predetermined number of shift positions when said control means is in said first axial position,
(F) said controlled shift lever being rotatable by said control means to a first shift position when said control means is in said second axial position and to a second shift position when said control means is in said third axial position,
(G) stop means fixed to said control means and said support means to prevent rotational movement of said controlled shift lever between said first and second shift positions when said controlled shift lever is in said first shift position and when said controlled shift lever is in said second shift position,
(H) and said stop means having ramps urged against each other by said variable rate spring means when said controlled shift lever is momentarily left in a position intermediate said first and second shift positions and operable to rotate said controlled shift lever to one of said first and second shift positions.

15. A shift control mechanism comprising in combination,
(A) a support column,
(B) a control tube supported by said support column for rotary and reciprocal movement relative to a fixed axis,
(C) a detent member fixed to said support column,
(D) a controlled shift lever fixed to said control tube,
(E) variable rate biasing means including a first spring having a first spring force and a second spring having a second spring force,
(F) said first spring being arranged to bias said control tube to a first axial position and yieldingly resist with one resisting force movement of said control tube to a second axial position and a third axial position,
(G) said second spring being prestressed and arranged to cooperate with said first spring to yieldingly resist with an abruptly increased resisting force movement of said control tube from said second axial position to said third axial position,
(H) said controlled shift lever being selectively rotatable with said control tube in said first, second and third axial positions to a predetermined number of shift positions,
(I) stop means on said controlled shift lever and detent member to prevent rotational movement of said controlled shift lever in one direction toward one of said shift positions when said controlled shift lever is in another of said shift positions and to prevent rotational movement of said controlled shift lever in the opposite direction toward said another shift position when said controlled shift lever is in said one shift position,
(J) and said stop means including means effective in cooperation with the combined spring forces of said first and second springs to rotate said controlled shift lever from a position intermediate said one and another shift positions to said another shift position.

16. The invention as defined in claim 15 and said second spring force being larger than said first spring force.

17. A shift control mechanism comprising in combination,
(A) a support column,
(B) a control tube supported by said support column for rotary and reciprocal movement relative to a fixed axis,
(C) a detent member fixed to said support column,
(D) a controlled shift lever fixed to said control tube,
(E) variable rate biasing means including first and second springs,
(F) said first spring being arranged to bias said control tube to a first axial position and yieldingly resist with one resisting force movement of said control tube to a second axial position and a third axial position,
(G) said second spring being prestressed and arranged to cooperate with said first spring to yieldingly resist with an abruptly increased resisting force movement of said control tube from said second axial position to said third axial position with an abruptly increased resisting force,
(H) said controlled shift lever being selectively rotatable with said control tube in said first, second and third axial positions to a predetermined number of shift positions,
(I) stop means on said controlled shift lever and detent member to prevent rotational movement of said controlled shift lever in one direction toward one of said shift positions when said controlled shift lever is in another of said shift positions and to prevent rotational movement of said controlled shift lever in the opposite direction toward said another shift position when said controlled shift lever is in said one shift position,
(J) and said stop means including inclined ramps urged to engage with each other by the combined forces of said first and second springs when said controlled shift lever is left in a position intermediate said one and another shift positions and operable to rotate said controlled shift lever from said intermediate position to said another shift position.

18. A shift control mechanism comprising in combination,
(A) a support column,
(B) a control tube supported by said support column for rotary and reciprocal movement relative to a fixed axis,
(C) a detent member fixed to said support column having a slot and a stop which extends in one axial direction,
(D) a lever fixed to said control tube having a tang extending in the opposite axial direction,
(E) a first spring having one spring force normally compressed and operatively arranged between said control tube and said support column to urge said control tube to a first axial position where said lever abuts with said detent member,
(F) said tang in said first axial position being received in said slot and in cooperation with the side walls of said slot limiting rotational movement of said lever between a predetermined number of shift positions,
(G) said first spring yieldingly resisting movement of said control tube to a second axial position where said tang clears said slot to permit rotation of said lever between a predetermined number of shift positions including at least one shift position,
(H) said tang in said second axial position being biased by said first spring to abut a first side wall portion of said detent member when said lever is in said one shift position,
(I) said tang being engageable with said stop in said second axial position to prevent rotation of said lever in one direction from said one shift position,
(J) a second spring having a larger spring force normally compressed and operatively arranged between first and second means on said control tube, one of said means being spaced from abutment means on said support column so that said second spring resists movement of said control tube from said second axial position to a third axial position whereby said first and second springs are effective to conjointly resist this movement,
(K) said tang in said third axial position clearing said stop to permit rotational movement between a predetermined number of shift positions including at least another shift position,
(L) said tang being biased by said first and second springs to abut a second side wall portion of said detent member projecting beyond said first side wall portion in said one axial direction and being engageable with said stop to prevent rotation of said lever in the opposite direction from said another shift position to said one shift position,
(M) an inclined ramp on said tang and an inclined ramp on said stop,
(N) and said ramps being urgeable into engagement with each other by the spring forces of said first and second springs when said lever is in a position intermediate said one and another shift positions and upon engagement with each other by the bias of said springs operable to rotate said lever to said one shift position.

19. A shift control mechanism comprising in combination,
(A) support means,
(B) control means supported by said support means for rotary and reciprocal movement relative to a fixed axis,
(C) controlled means operatively connected to rotate and reciprocate with said control means,
(D) biasing means providing a biasing force resisting axial movement of said control means in one axial direction from one position to another position,
(E) said controlled means upon selective rotation of said control means being rotatable in said another position between a plurality of shift positions,
(F) and means responsive to the biasing force of said biasing means when said controlled means is momentarily left in a position intermediate two of said shift positions operable to rotate said controlled means to one of said two shift positions.

References Cited by the Examiner
UNITED STATES PATENTS
2,905,016  9/1959  Gorsky _____ 74—475

MILTON KAUFMAN, *Primary Examiner.*